(12) United States Patent
Homma

(10) Patent No.: US 9,212,702 B2
(45) Date of Patent: Dec. 15, 2015

(54) MULTI-FREE-DISK TYPE OF CLUTCH

(71) Applicant: Homma Science Corporation, Tokamachi-Shi (JP)

(72) Inventor: Akira Homma, Tokamachi (JP)

(73) Assignee: Homma Science Corporation, Tokamachi-Shi (JP)

( * ) Notice: Subject to any disclaimer, the term of this patent is extended or adjusted under 35 U.S.C. 154(b) by 0 days.

(21) Appl. No.: 14/356,438

(22) PCT Filed: Nov. 2, 2012

(86) PCT No.: PCT/JP2012/078483
§ 371 (c)(1),
(2) Date: May 6, 2014

(87) PCT Pub. No.: WO2013/069569
PCT Pub. Date: May 16, 2013

(65) Prior Publication Data
US 2014/0326571 A1  Nov. 6, 2014

(30) Foreign Application Priority Data

Nov. 8, 2011  (JP) ................ 2011-244624

(51) Int. Cl.
| | |
|---|---|
| *F16D 13/52* | (2006.01) |
| *F16D 67/02* | (2006.01) |
| *F16D 43/10* | (2006.01) |
| *F16D 43/18* | (2006.01) |
| *F16D 13/64* | (2006.01) |
| *F16D 43/30* | (2006.01) |

(52) U.S. Cl.
CPC ............. *F16D 13/52* (2013.01); *F16D 13/648* (2013.01); *F16D 43/10* (2013.01); *F16D 43/18* (2013.01); *F16D 43/30* (2013.01); *F16D 67/02* (2013.01)

(58) Field of Classification Search
CPC .............................. F16D 43/40; F16D 13/648
See application file for complete search history.

(56) References Cited

FOREIGN PATENT DOCUMENTS

| EP | 0896165 | * | 4/1998 |
|---|---|---|---|
| JP | 61-152827 U | | 9/1986 |
| JP | 04-084832 U | | 7/1992 |
| JP | 05-036124 U | | 5/1993 |
| JP | 11-230196 A1 | | 8/1999 |
| JP | 2007-069787 A1 | | 3/2007 |
| JP | 09-257057 A1 | | 9/2007 |
| JP | 2009-056883 A1 | | 3/2009 |

OTHER PUBLICATIONS

International Search Report (Application No. PCT/JP2012/078483) dated Dec. 25, 2012 (with English translation).

* cited by examiner

*Primary Examiner* — Ramya Burgess
*Assistant Examiner* — Mark Manley
(74) *Attorney, Agent, or Firm* — Burr & Brown, PLLC

(57) ABSTRACT

The invention includes at least two free disks arranged between a drive-torque transmission disk and an output-torque receiving disk, each of the at least two free disks being freely rotatable. When a torque is to be transmitted, mutual gaps between the drive-torque transmission disk, the at least two free disks and the output-torque receiving disk are narrowed, so that the input torque of the driving unit is transmitted from the drive-torque transmission disk to one free disk adjacent to the drive-torque transmission disk by friction, the torque transmitted to the one free disk is transmitted to another free disk adjacent to the one free disk by friction, and the torque transmitted to the or another free disk on the most output-shaft side is transmitted to the output-torque receiving disk by friction.

9 Claims, 3 Drawing Sheets

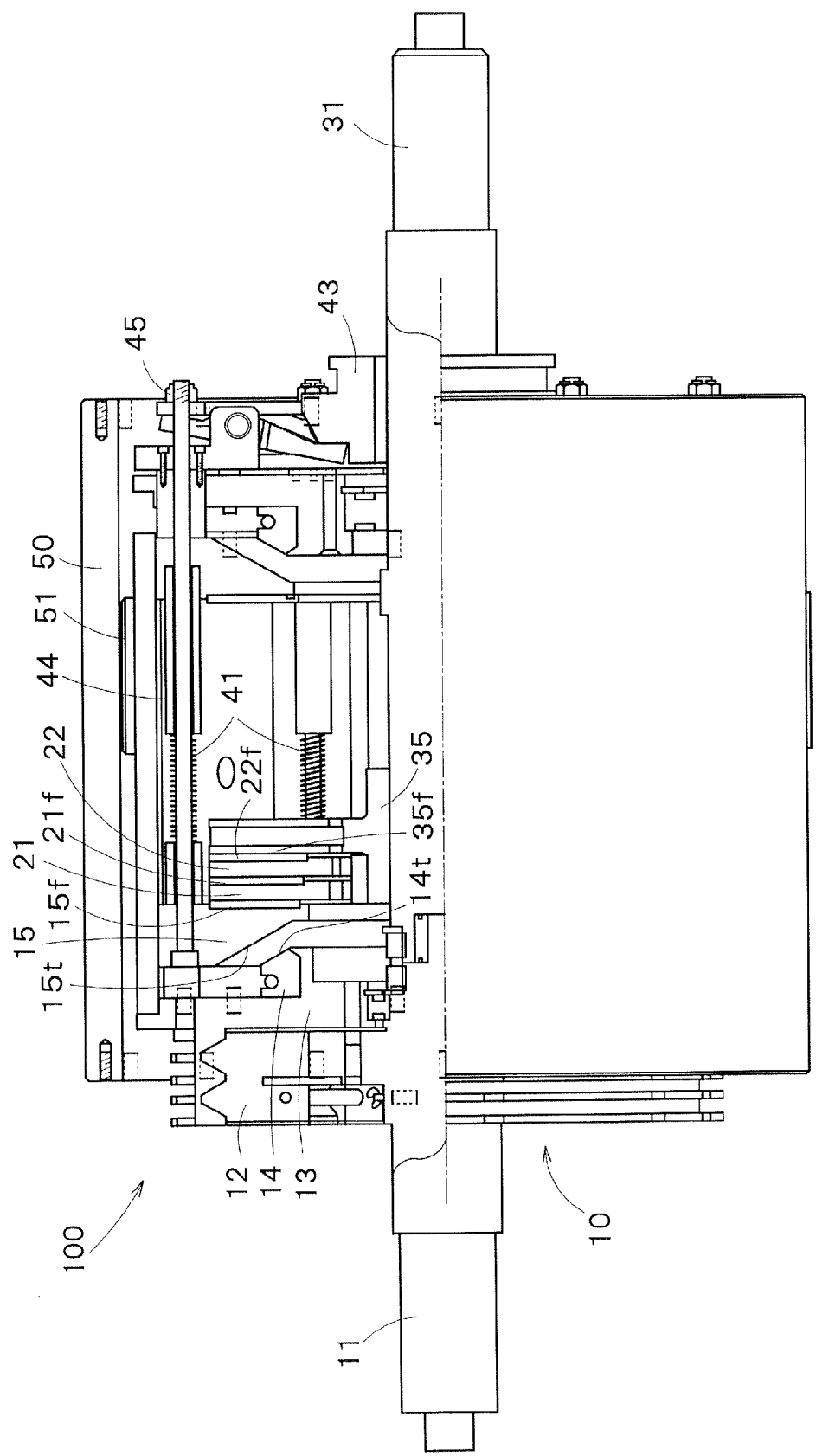
F I G. 1

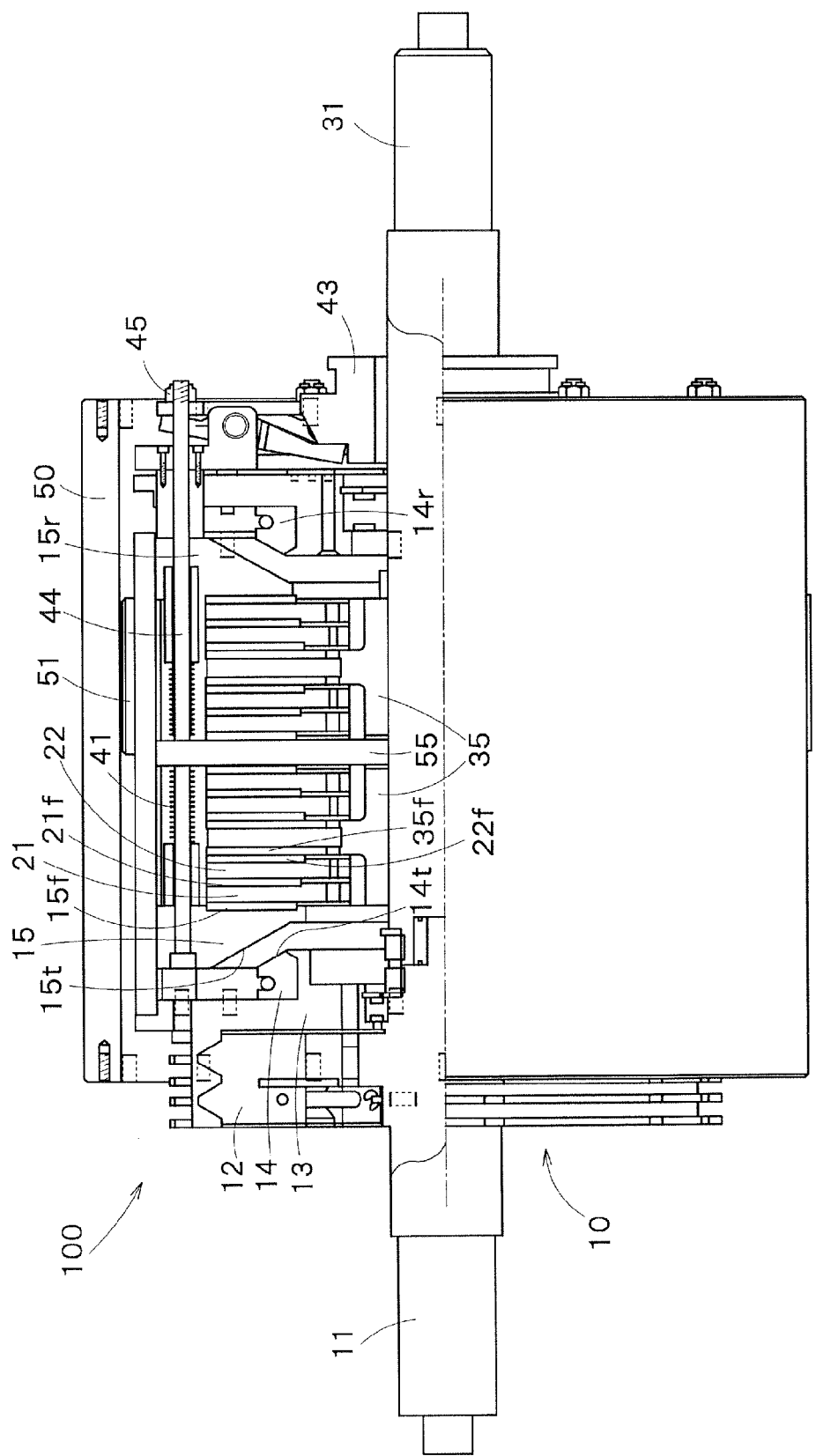
F I G. 2

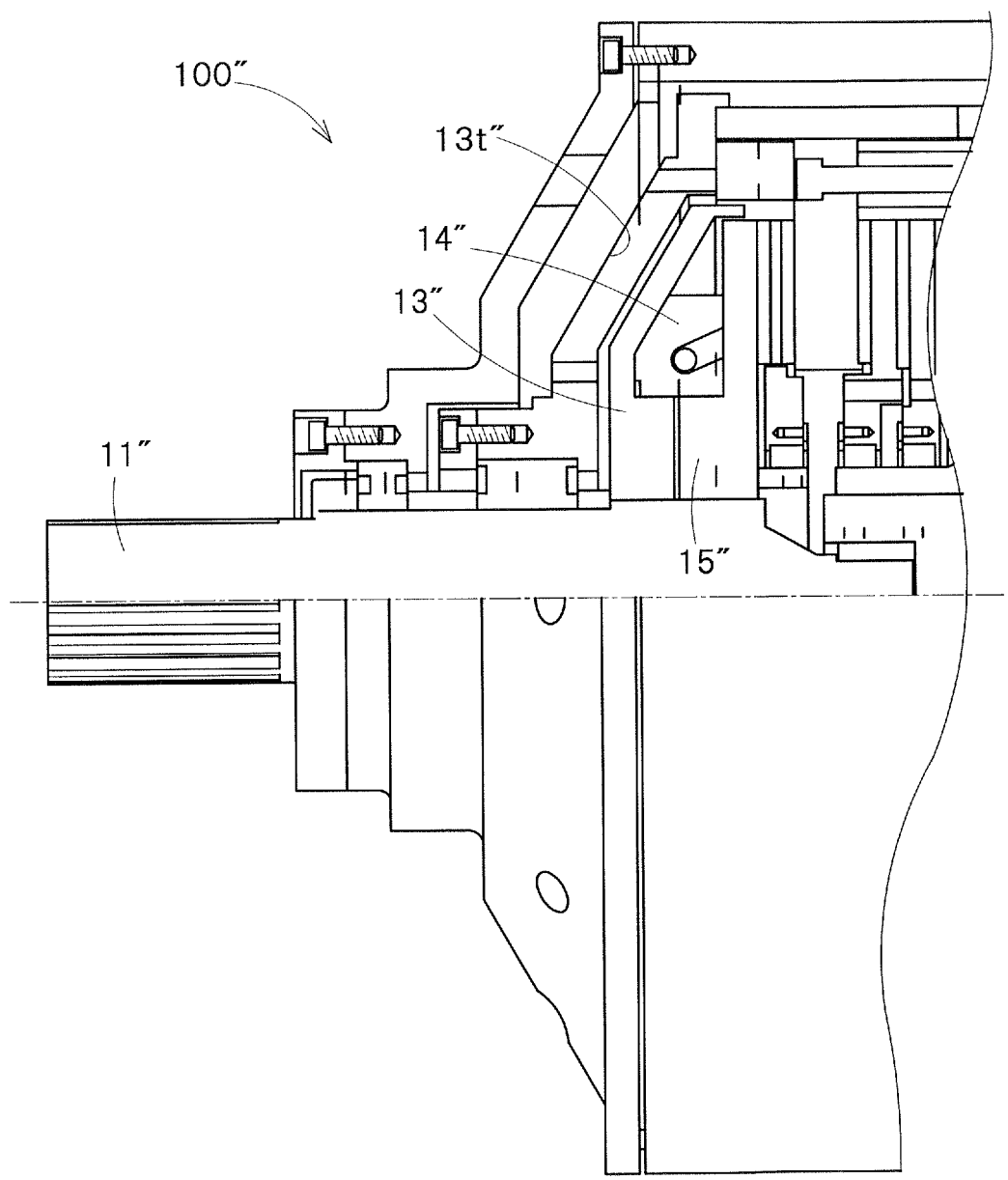
F I G. 3

MULTI-FREE-DISK TYPE OF CLUTCH

BACKGROUND OF THE INVENTION

1. Field of the Invention

The present invention relates to a clutch that achieves a smooth transition from a torque shut-off status to a torque transmission status when a mobile device starts, in particular when an automobile starts.

2. Description of Related Art

Various types of clutches, which achieve a smooth transition from a torque shut-off status to a torque transmission status, have been already put to practical use.

If these clutches can have a brake function as well, a space required for components can be saved, which is preferable. However, there is no development example for a clutch having a brake function as well.

The abstract of patent document 1 (JP 2009-56883 A1) discloses that a transmission for a working vehicle having side clutches also serving as brakes is provided. However, when the structure of the transmission is studied in detail, a clutch body for the clutch function and a multi-disk brake for the brake function are completely separate structures.

SUMMARY OF THE INVENTION

The present invention was accomplished in light of the above problems in the conventional art. An object of the invention is therefore to provide a clutch having a brake function as well.

The present invention is a multi-free-disk type of clutch comprising: a driving unit configured to rotate in accordance with an input torque, the driving unit having a drive-torque transmission disk; an output shaft to which a torque is to be transmitted, the output shaft having an output-torque receiving disk; and at least two free disks arranged between the drive-torque transmission disk and the output-torque receiving disk, each of the at least two free disks being freely rotatable; wherein when the torque is to be transmitted, mutual gaps between the drive-torque transmission disk, the at least two free disks and the output-torque receiving disk are narrowed, so that the input torque of the driving unit is transmitted from the drive-torque transmission disk to one free disk adjacent to the drive-torque transmission disk by friction, the torque transmitted to the one free disk is transmitted to another free disk adjacent to the one free disk by friction, and the torque transmitted to the or another free disk on the most output-shaft side is transmitted to the output-torque receiving disk by friction; and when the torque is to be shut off, the mutual gaps between the drive-torque transmission disk, the at least two free disks and the output-torque receiving disk are broadened, so that torque transmission channel is shut off.

According to the present invention, a clutch that achieves a smooth transition from a torque shut-off status to a torque transmission status can be provided. The degree of the smoothness is as if a smooth gear change is carried out from a low gear to a high gear. In this sense, it can be said that a transmission function is achieved as well. In addition, after the torque shut-off status has been achieved, if the driving unit is decelerated or stopped in advance and the torque transmission status is achieved again so that the thus stopped torque is transmitted, a suitable brake function for the output shaft can be achieved as well.

Herein, if only such a brake function is achieved, there is no need to particularly consider friction surfaces regarding the at least two free disks. That is to say, it may be allowed that the size of each friction surface (each torque transmission surface) is the same. However, as a result of the careful study by the inventor, it has been found that the size of each friction surface should be particularly considered in view of durability of the at least two free disks, in order to achieve the clutch function.

The inventor thinks that the reason is as follows. When the clutch functions as a brake, each friction surface (each torque transmission surface) changes from a high-speed status to a low-speed status or a stopped status. On the other hand, when the clutch functions as a clutch, each friction surface (each torque transmission surface) changes from a stopped status to a high-speed status.

According to the inventor's careful study, even if the same material is used, the coefficient of friction is larger when the rotational speed is lower. For example, when the coefficient of friction is represented as 1 when the rotational speed is 50 km/h, the coefficient of friction is 1.025 when the rotational speed is 25 km/h and the coefficient of friction is 1.05 when the rotational speed is 12.5 km/h.

The frictional force acted on the friction surface is proportional to a product of the coefficient of friction and a contact pressure. The contact pressure is inversely proportional to an area of the friction surface. Thus, in order to equalize the frictional force acted on the friction surface on one side of a free disk and that on the other side thereof, it is desirable to determine an area of each friction surface taking into consideration the difference of the coefficients of friction.

When the clutch functions as a clutch at a starting process, the rotational speed of the driving unit is larger than the rotational speed of the output shaft. Thus, it is thought that the coefficient of friction on the driving-unit side is smaller than that on the output-shaft side. Thus, it should be taken into consideration as an important point that an area of the friction surface on the driving-unit side is set smaller than an area of the friction surface on the output-shaft side.

Specifically, it is preferable that an area of a friction surface between the drive-torque transmission disk and the one free disk adjacent to the drive-torque transmission disk is smaller than an area of a friction surface between the one free disk adjacent to the drive-torque transmission disk and the another free disk adjacent to the one free disk. In addition, based on the same reason, it is preferable that an area of a friction surface between the output-torque receiving disk and the free disk adjacent to the output-torque receiving disk is larger than an area of a friction surface between the free disk adjacent to the output-torque receiving disk and another free disk adjacent to the free disk.

In a concrete embodiment, if the at least two free disks are two free disks, it is preferable that an area of a friction surface between the one free disk adjacent to the drive-torque transmission disk and the free disk adjacent to the output-torque receiving disk is larger than an area of a friction surface between the drive-torque transmission disk and the one free disk adjacent to the drive-torque transmission disk, and smaller than an area of a friction surface between the output-torque receiving disk and the free disk adjacent to the output-torque receiving disk.

In addition, in the present invention, it is preferable that the drive-torque transmission disk is arranged in a movable manner in an axial direction thereof with respect to the output-torque receiving disk. In this case, for example, it is preferable that the drive-torque transmission disk is configured to move toward the output-torque receiving disk by means of an action of an axial-pressure centrifugal weight that moves radially outward when the driving unit rotates. In this case, since the axial-pressure centrifugal weight automatically moves the drive-torque transmission disk in the axial direction thereof when the driving unit rotates, an engagement of the clutch can be automatically actuated.

In addition, in this case, it is further preferable that the drive-torque transmission disk is biased by a spring in such a manner that the drive-torque transmission disk moves away from the output-torque receiving disk when the axial-pressure centrifugal weight returns radially inward when the driving unit is decelerated or stopped. In this case, since the action of the axial-pressure centrifugal weight is automatically removed when the driving unit is decelerated or stopped, a release of the clutch can be automatically actuated.

In general, on the driving unit, a braking unit for the driving-unit is provided for decelerating or stopping the driving unit. For example, any publicly known band brake may be adopted.

In addition, in the present invention, it is preferable that a braking-activating unit configured to move the drive-torque transmission disk toward the output-torque receiving disk, when the driving unit is to be decelerated or stopped, is provided. According to this structure, after the driving unit has been decelerated or stopped in advance, the torque transmission status can be achieved again so that the thus stopped torque is transmitted. Thus, a suitable brake function for the output shaft can be achieved.

BRIEF DESCRIPTION OF THE DRAWINGS

FIG. 1 is a schematic longitudinal section view showing a multi-free-disk type of clutch according to an embodiment of the present invention;

FIG. 2 is a schematic longitudinal section view showing a multi-free-disk type of clutch according to another embodiment of the present invention; and FIG. 3 is a schematic longitudinal section view showing a part of a multi-free-disk type of clutch according to further another embodiment of the present invention.

DETAILED DESCRIPTION OF THE INVENTION

With reference to the attached drawings, embodiments of the present invention are explained in detail hereinbelow.

FIG. 1 is a schematic longitudinal section view showing a multi-free-disk type of clutch according to an embodiment of the present invention. The multi-free-disk type of clutch according to this embodiment 100 is a clutch for connecting and disconnecting a power transmission between a driving unit 10 that rotates in accordance with an input torque and an output shaft 31 to which a torque is to be transmitted.

A structure including the multi-free-disk type of clutch according to this embodiment 100 is herein an automobile. That is, an internal combustion engine or an electrical motor gives an input torque to the driving unit 10, and the output shaft 31 is connected to a wheel suspension shaft. In this embodiment, as shown in FIG. 1, the driving shaft 11 (torque input shaft) of the driving unit 10 and the output shaft 31 are concentric with each other.

On the driving shaft 11, there is provided a centrifugal weight 12, which moves radially outward by a centrifugal force when the driving unit 11 rotates. The centrifugal weight 12 is configured to joint on a driving-unit frame 13 when the centrifugal weight 12 moves radially outward. Thus, when the driving unit 11 rotates, the driving-unit frame 13 is configured to rotate together with the driving shaft 11.

On the driving-unit frame 13, there is provided an axial-pressure centrifugal weight 14, which moves radially outward by a centrifugal force when the driving-unit frame 13 rotates. The axial-pressure centrifugal weight 14 has a tapered surface 14t. When the axial-pressure centrifugal weight 14 moves radially outward, the tapered surface 14t is configured to come in contact with a corresponding tapered surface 15t of a drive-torque transmission disk 15 and to push the same toward the output shaft 31 in an axial direction.

The drive-torque transmission disk 15 is arranged in the driving-unit frame 13 in a slidable manner in an axial direction thereof. The drive-torque transmission disk 15 is configured to rotate together with the driving-unit frame 13 regarding a circumferential direction thereof.

On the other hand, an output-torque receiving disk 35 is integrally provided on the output shaft 31. There are provided two free disks 21, 22 between the drive-torque transmission disk 15 and the output-torque receiving disk 35, each of the two free disks 21, 22 being independently supported by bearings in a freely rotatable manner.

When the torque is to be transmitted (when the clutch is engaged), mutual gaps between the drive-torque transmission disk 15, the two free disks 21, 22 and the output-torque receiving disk 35 are narrowed, so that the input torque of the driving unit 10 is transmitted from the drive-torque transmission disk 15 to the first free disk 21 by friction, the torque transmitted to the first free disk 21 is transmitted to the second free disk 22 by friction, and the torque transmitted to the second free disk 22 is transmitted to the output-torque receiving disk 35 by friction.

More specifically, a drive-side friction body 15f integrally provided on the drive-torque transmission disk 15 frictionally engages with the first free disk 21 so that the torque transmission is carried out therebetween, a first friction body 21f integrally provided on the first free disk 21 frictionally engages with the second free disk 22 so that the torque transmission is carried out therebetween, and a second friction body 22f integrally provided on the second free disk 22 frictionally engages with the output-side friction body 35f integrally provided on the output-torque receiving disk 35 so that the torque transmission is carried out therebetween. The respective contact pressures and so on are explained hereinbelow. In this embodiment, the respective friction bodies 15f, 21f, 22f, 35f are made of a material selected from a sintered alloy, ceramics, synthetic resin, special synthetic resin, and so on, which are common as a material for a disk brake. The respective disks 15, 21, 22, 35 themselves are made of a metal (ACUTO-440 made by Aichi Steel Corporation is suitable).

On the other hand, when the torque is to be shut off (when the clutch is released), in this embodiment, the mutual gap between the drive-torque transmission disk 15 and the first free disk 21 is broadened to about 1 mm, so that these disks are surely separated apart, thereby the torque transmission channel is shut off. Specifically, the drive-torque transmission disk 15 is biased by springs 41 in such a manner that the drive-torque transmission disk 15 moves away from the first free disk 21 when the axial-pressure centrifugal weight 14 returns radially inward (the axial-pressure centrifugal weight 14 releases the joining action) when the driving-unit frame 13 is decelerated or stopped.

In addition, a band brake 51 for braking the rotation of the driving-unit frame 13 is provided on an inside wall of a housing 50, which is provided outside the driving-unit frame 13. In this embodiment, when the driving-unit frame 13 is decelerated or stopped by the band brake 51, the drive-torque transmission disk 15 is also decelerated or stopped. In order to brake the free disks 21, 22 and the output-torque receiving disk 35 (and the output shaft 31) by means of the thus decelerated or stopped drive-torque transmission disk 15, there is provided a braking-activating unit configured to move the drive-torque transmission disk 15 toward the first free disk 21.

In the braking-activating unit of this embodiment, when a brake lever 43 is pressed inward (leftward in FIG. 1), brake rods 44 (six brake rods are arranged at regular intervals in a circumferential direction) move outward (rightward in FIG. 1), and thus left-end large-diameter portions of the brake rods 44 move together with the drive-torque transmission disk 15 toward the first free disk 21. When the torque transmission status between the drive-torque transmission disk 15 and the first free disk 21 is achieved again, the low or stopped torque status of the drive-torque transmission disk 15 acts for braking the first free disk 21 and so on. When the inward press of the brake lever 43 is stopped, the brake rods 44 are configured to return to their original positions by a biasing force of the springs 41. The movable distance (braking force) of the brake rods 44 can be adjusted by means of adjustment nuts 45.

Next, the contact pressures and the braking forces acted on the drive-side friction body 15$f$, the first friction body 21$f$, the second friction body 22$f$ and the output-side friction body 35$f$ are explained in detail. Regarding these friction bodies, if only a brake function is focused, these friction bodies may be made of the same material and formed into the same size. However, as a result of the careful study by the inventor, it has been found that the size of each friction surface should be particularly considered in view of durability of the respective friction bodies 15$f$, 21$f$, 22$f$, 35$f$ and the respective free disks 21, 22, in order to achieve the clutch function.

The inventor thinks that the reason is as follows. When the clutch functions as a brake, each friction surface (each torque transmission surface) changes from a high-speed status to a low-speed status or a stopped status. On the other hand, when the clutch functions as a clutch, each friction surface (each torque transmission surface) changes from a stopped status to a high-speed status.

According to the inventor's careful experimental study, even if the same resin material is used, the coefficient of friction is larger when the rotational speed is lower. This coincides with the general tendency that is known as Galton's law. For example, when the coefficient of friction is represented as 1 when the rotational speed is 50 km/h, the coefficient of friction is 1.025 when the rotational speed is 25 km/h, the coefficient of friction is 1.05 when the rotational speed is 12.5 km/h.

Specifically, in the case of a resin that was used for the respective friction bodies 15$f$, 21$f$, 22$f$, 35$f$ in this embodiment, when the coefficient of friction is 0.500 if the rotational speed is 50 km/h, the coefficient of friction is 0.5125 if the rotational speed is 25 km/h and the coefficient of friction is 0.525 if the rotational speed is 12.5 km/h.

It has been known that the frictional force acted on the friction surface is proportional to a product of the coefficient of friction and a contact pressure. The contact pressure is inversely proportional to an area of the friction surface. Thus, in order to equalize the frictional force acted on the friction surface on one side of a free disk and that on the other side thereof, it is desirable to determine an area of each friction surface taking into consideration the difference of the coefficients of friction.

When the clutch functions as a clutch at a starting process, the rotational speed of the driving unit 10 is larger than the rotational speed of the output shaft 31. Thus, it is thought that the coefficient of friction on the side of the driving-unit 10 is smaller than that on the side of the output-shaft 31. Thus, it should be taken into consideration as an important point that an area of the friction surface on the side of the driving-unit 10 is set smaller than an area of the friction surface on the side of the output-shaft 31.

That is to say, in this embodiment, it is preferable that an area of a friction surface between the first friction body 21$f$ of the first free disk 21 and the second free disk 22 is larger than an area of a friction surface between the drive-side friction body 15$f$ of the drive-torque transmission disk 15 and the first free disk 21, and smaller than an area of a friction surface between the output-side friction body 35$f$ of the output-torque receiving disk 35 and the second friction body 22$f$ of the second free disk 22.

Specifically, in a case that the rotational speed of the driving unit 10 is 50 km/h at the starting process, a torque transmission is carried out between the drive-side friction body 15$f$ of the drive-torque transmission disk 15 and the first free disk 21, at an early stage of the torque transmission starting. At that time, the second free disk 22 is still stationary, so that the first free disk 21 is accelerated to 25 (50/2) km/h. Subsequently, a torque transmission is carried out between the first friction body 21$f$ of the first free disk 21 and the second free disk 22. At that time, the output-torque receiving disk 35 is still stationary, so that the second free disk 22 is accelerated to 12.5 (25/2) km/h.

It can be thought that this status is approximately a basic status. Then, it can be thought that the coefficient of friction of the friction surface between the drive-side friction body 15$f$ of the drive-torque transmission disk 15 and the first free disk 21 is 0.500, the coefficient of friction of the friction surface between the first friction body 21$f$ of the first free disk 21 and the second free disk 22 is 0.5125, and the coefficient of friction of the friction surface between the output-side friction body 35$f$ of the output-torque receiving disk 35 and the second friction body 22$f$ of the second free disk 22 is 0.525.

Correspondingly, when the contact pressures of the respective friction surfaces are calculated in order that the friction forces acted on the respective friction surfaces are uniform, it is sufficient that the contact pressure between the drive-side friction body 15$f$ of the drive-torque transmission disk 15 and the first free disk 21 is 0.051, the contact pressure between the first friction body 21$f$ of the first free disk 21 and the second free disk 22 is 0.050, and the contact pressure between the output-side friction body 35$f$ of the output-torque receiving disk 35 and the second friction body 22$f$ of the second free disk 22 is 0.049.

An example of the sizes of the respective friction surfaces for achieving the above contact pressures is: an annular friction surface whose inner diameter is 200 mm and whose outer diameter is 300 mm, regarding the friction surface between the drive-side friction body 15$f$ of the drive-torque transmission disk 15 and the first free disk 21; an annular friction surface whose inner diameter is 182 mm and whose outer diameter is 290 mm, regarding the friction surface between the first friction body 21$f$ of the first free disk 21 and the second free disk 22; and an annular friction surface whose inner diameter is 170 mm and whose outer diameter is 285 mm, regarding the friction surface between the output-side friction body 35$f$ of the output-torque receiving disk 35 and the second friction body 22$f$ of the second free disk 22. Alternatively, another example thereof is: an annular friction surface whose inner diameter is 185 mm and whose outer diameter is 300 mm, regarding the friction surface between the drive-side friction body 15$f$ of the drive-torque transmission disk 15 and the first free disk 21; an annular friction surface whose inner diameter is 181 mm and whose outer diameter is 300 mm, regarding the friction surface between the first friction body 21$f$ of the first free disk 21 and the second free disk 22; and an annular friction surface whose inner diameter is 176 mm and whose outer diameter is 300 mm, as the friction surface between the output-side friction body 35*f* of the output-torque receiving disk 35 and the second friction body 22*f* of the second free disk 22.

Next, an operation of the embodiment as structured above is explained. At first, an operation for a starting process of a stationary automobile is explained.

When an input torque from an internal combustion engine or an electrical motor not shown is transmitted to the driving shaft 11, the driving shaft 11 rotates in accordance with the input torque. Herein, the driving shaft 11 rotates at a rotational speed corresponding to 50 km/h.

When the driving shaft 11 rotates, the centrifugal weight 12 moves radially outward by the action of the centrifugal force. When the centrifugal weight 12 moves radially outward, the centrifugal weight 12 joints on the driving-unit frame 13. Then, the driving-unit frame 13 rotates together with the driving shaft 11. When the driving-unit frame 13 rotates, the axial-pressure centrifugal weight 14 moves radially outward. When the axial-pressure centrifugal weight 14 moves radially outward, the tapered surface 14*t* of the axial-pressure centrifugal weight 14 comes in contact with the tapered surface 15*t* of the drive-torque transmission disk 15 and pushes the same toward the output shaft 31 in the axial direction.

Thus, the input torque of the driving unit 10 is transmitted from the drive-torque transmission disk 15 to the first free disk 21 by friction, the torque transmitted to the first free disk 21 is transmitted to the second free disk 22 by friction, and the torque transmitted to the second free disk 22 is transmitted to the output-torque receiving disk 35 by friction.

Specifically, a torque transmission is carried out between the drive-side friction body 15*f* of the drive-torque transmission disk 15 and the first free disk 21, at an early stage of the torque transmission starting. At that time, the second free disk 22 is still stationary, so that the first free disk 21 is accelerated to 25 (50/2) km/h. Subsequently, a torque transmission is carried out between the first friction body 21*f* of the first free disk 21 and the second free disk 22. At that time, the output-torque receiving disk 35 is still stationary, so that the second free disk 22 is accelerated to 12.5 (25/2) km/h. Subsequently, a torque transmission is carried out between the second friction body 22*f* of the second free disk 22 and the output-side friction body 35*f* of the output-torque receiving disk 35. At that time, the output-side friction body 35*f* of the output-torque receiving disk 35 is driven by the rotating disk whose speed is 12.5 km/h, i.e., relatively low. Thus, the start of the rotation of the output-side friction body 35*f* of the output-torque receiving disk 35 is extremely smooth.

Assuming that this status is approximately a basic status, the above sizes of the respective friction surfaces are adopted, so that the frictional forces acted on the respective friction surfaces can be made uniform. This is extremely advantageous for the durability of the two free disks.

When the torque transmission continues, the first free disk 21, the second free disk 22 and the output-torque receiving disk 35 are gradually accelerated, so that the speed differences between the respective friction surfaces disappear. Finally, the status becomes as if the driving shaft 11 and the output shaft 31 are directly connected, that is, the output shaft 31 rotates at a rotational speed corresponding to 50 km/h.

According to the experiments made by the inventor, from the start of the rotation of the output shaft 31 (the output-side friction body 35*f* of the output-torque receiving disk 35) to the status as if the driving shaft 11 and the output shaft 31 are directly connected, the speed of the output shaft 31 is smoothly increased. The degree of the smoothness is as if a smooth gear change is carried out from a low gear to a high gear. In this sense, it can be said that the multi-free-disk type of clutch of this embodiment 100 achieves a transmission function as well.

Next, a brake function to stop the running automobile is explained. In the case of an electrical automobile, a regenerative brake is usually used in combination. In the case of an engine automobile, an engine brake is usually used in combination. Herein, an operation for generating a braking force greater than those of the above brakes is explained.

For example, when the driver operates a foot brake, the band brake 51 for braking the rotation of the driving-unit frame 13 is activated. Thereby, the driving-unit frame 13 is decelerated or stopped. When the driving-unit frame 13 is decelerated or stopped, the axial-pressure centrifugal weight 14 returns radially inward, so that the drive-torque transmission disk 15 moves away from the first free disk 21 by means of the biasing force of the springs 41. Thus, a torque shut-off status is achieved in the multi-free-disk type of clutch of this embodiment 100.

The driving shaft 11 is also decelerated or stopped by a stop of fuel supply to the internal combustion engine or a stop of electricity supply to the electrical motor. Thereby, the centrifugal weight 12 returns radially inward, so that the driving shaft 11 and the driving-unit frame 13 are separated. By adjustment of moving degree of the centrifugal weight 12 based on the centrifugal force, the driving-unit frame 13 can be stopped even if the driving shaft 11 is still rotating, i.e., maintains an idling state.

When the driving-unit frame 13 is decelerated or stopped, the drive-torque transmission disk 15 is decelerated or stopped. By means of the thus decelerated or stopped drive-torque transmission disk 15, the free disks 21, 22 and the output-torque receiving disk 35 (and the output shaft 31) can be braked.

In this embodiment, after a stop of the rotation of the drive-torque transmission disk 15 or a rotation speed thereof lower than a threshold speed has been detected, the brake lever 43 is automatically pressed inward (leftward in FIG. 1), the brake rods 44 (six brake rods are arranged at regular intervals in the circumferential direction) move outward (rightward in FIG. 1), and thus left-end large-diameter portions of the brake rods 44 move together with the drive-torque transmission disk 15 toward the first free disk 21. Thus, the torque transmission status is achieved again between the drive-torque transmission disk 15 and the first free disk 21. Thereby, the low or stopped torque status of the drive-torque transmission disk 15 acts for breaking the first free disk 21 and so on. According to the experiments made by the inventor, this braking action is very strong, which is sufficient for braking a large-sized automobile such as a large-sized bus.

When the operation of the foot brake is released, or when the output shaft 31 has been stopped, the inward press of the brake lever 43 is automatically stopped, the brake rods 44 return to their original positions by the biasing force of the springs 41, and the status returns to the initial one before the starting process.

As described above, the multi-free-disk type of clutch 100 of this embodiment can achieve the smooth transition from the torque shut-off status to the torque transmission status. The degree of the smoothness is as if a smooth gear change is carried out from a low gear to a high gear. In this sense, it can be said that a transmission function is achieved as well. In addition, after the torque shut-off status has been achieved, if the driving unit 10 is decelerated or stopped in advance and the torque transmission status is achieved again so that the thus stopped torque is transmitted, a suitable brake function for the output shaft 31 can be achieved as well.

The multi-free-disk type of clutch 100 of this embodiment can function as a brake as well. Thus, there is no need to provide a separate brake system, which is preferable to save a space. In addition, the braking force generated by the multi-free-disk type of clutch 100 of this embodiment is strong enough to be used for a large-sized automobile such as a large-sized bus.

In addition, according to the multi-free-disk type of clutch 100 of this embodiment, since the above-described sizes of the respective friction surfaces are adopted, the frictional forces acted on the respective friction surfaces can be made uniform. This is extremely advantageous in view of the durability of the two free disks 21, 22.

In addition, as described above, it can be said that the multi-free-disk type of clutch 100 of this embodiment can function as a transmission as well. However, when it is provided for an engine automobile, it is necessary to provide a back gear separately. On the other hand, when it is provided for an electrical automobile, since it is possible to reversely drive an electrical motor thereof, it is not necessary to provide any separate transmission.

Next, FIG. 2 is a schematic longitudinal section view showing a multi-free-disk type of clutch according to another embodiment of the present invention. In this embodiment, the output-torque receiving disk 35 is movable with respect to the output shaft 31 in the axial direction. Instead, there is provided an output-torque receiving central disk 55 integrally fixed to the output shaft 31.

In more detail, in the multi-free-disk type of clutch 100' of this embodiment, the set of the drive-side friction body 15f, the first friction body 21f, the second friction body 22f and the output-side friction body 35f, which generate a braking force, is provided in a left-right symmetrical relationship, i.e., not only on the left side in FIG. 2 with respect to the output-torque receiving disk 35 but also on the right side. The right-most drive-side friction body 15f is configured to transmit a torque to the output-torque receiving central disk 55. Furthermore, the output-torque receiving disk 35 together with such two sets of the above components that generate a braking force is provided on the right side with respect to the output-torque receiving central disk 55 as well. As a result, the serial arrangement of the four sets of the components is achieved. The right-most drive-side friction body 15f is configured to transmit a torque to a right-side symmetric disk 15r that is symmetrical to the drive-torque transmission disk 15. The right-side symmetric disk 15r is configured to be pressed leftward by an axial-pressure centrifugal weight 14r.

In the multi-free-disk type of clutch 100' of this embodiment, the four sets of the drive-side friction body 15f, the first friction body 21f, the second friction body 22f and the output-side friction body 35f, which generate a braking force in the multi-free-disk type of clutch 100 shown in FIG. 1, are serially arranged. Thus, the multi-free-disk type of clutch 100' can achieve a braking force four times as large as that by the multi-free-disk type of clutch 100 shown in FIG. 1.

In addition, the structure for connecting the driving shaft 11 and the driving-unit frame 13 via the centrifugal weight 12 can be omitted. That is to say, like a multi-free-disk type of clutch 100" shown in FIG. 3, the driving shaft 11" and the driving-unit frame 13" can be directly connected. In this case, as a structure for the axial-pressure centrifugal weight 14" to press the drive-torque transmission disk 15", the driving-unit frame 13" can have a tapered surface 13t", as shown in FIG. 3.

10 Driving unit
11 Driving shaft (torque input shaft)
12 Centrifugal weight
13 Driving-unit frame
14 Axial-pressure centrifugal weight
15 Drive-torque transmission disk
15f Drive-side friction body
21 First free disk
21f First friction body
22 Second free disk
22f Second friction body
31 Output shaft
35 Output-torque receiving disk
35f Output-side friction body
41 Spring
43 Brake lever
44 Brake rod
45 Adjustment nut
50 Housing
51 Band brake
55 Output-torque receiving central disk
100, 100', 100" Multi-free-disk type of clutch

The invention claimed is:

1. A multi-free-disk type of clutch comprising
a driving unit configured to rotate in accordance with an input torque, the driving unit having a drive-torque transmission disk,
an output shaft to which a torque is to be transmitted, the output shaft having an output-torque receiving disk, and
at least two free disks arranged between the drive-torque transmission disk and the output-torque receiving disk, each of the at least two free disks being freely rotatable,
wherein
when the torque is to be transmitted;
mutual gaps between the drive-torque transmission disk, the at least two free disks and the output-torque receiving disk are narrowed, so that
the input torque of the driving unit is transmitted from the drive-torque transmission disk to one free disk adjacent to the drive-torque transmission disk by friction,
the torque transmitted to the one free disk is transmitted to another free disk adjacent to the one free disk by friction, and
the torque transmitted to the or another free disk, adjacent to the output-torque receiving disk is transmitted to the output-torque receiving disk by friction, and
when the torque is to be shut off;
the mutual gaps between the drive-torque transmission disk, the at least two free disks and the output-torque receiving disk are broadened, so that torque transmission channel is shut off.

2. The multi-free-disk type of clutch according to claim 1, wherein
an area of a friction surface between the drive-torque transmission disk and the one free disk adjacent to the drive-torque transmission disk is smaller than an area of a friction surface between the one free disk adjacent to the drive-torque transmission disk and the another free disk adjacent to the one free disk.

3. The multi-free-disk type of clutch according to claim 1, wherein
an area of a friction surface between the output-torque receiving disk and the another free disk adjacent to the output-torque receiving disk is larger than an area of a friction surface between the another free disk adjacent to the output-torque receiving disk and another free disk adjacent to the another free disk adjacent to the output-torque receiving disk.

4. The multi-free-disk type of clutch according to claim 1, wherein
a number of the at least two free disks are two,
an area of a friction surface between the one free disk adjacent to the drive-torque transmission disk and the another free disk adjacent to the output-torque receiving disk is
larger than an area of a friction surface between the drive-torque transmission disk and the one free disk adjacent to the drive-torque transmission disk, and
smaller than an area of a friction surface between the output-torque receiving disk and the another free disk adjacent to the output-torque receiving disk.

5. The multi-free-disk type of clutch according to claim 1, wherein
the drive-torque transmission disk is arranged in a movable manner in an axial direction thereof with respect to the output-torque receiving disk.

6. The multi-free-disk type of clutch according to claim 5, wherein
the drive-torque transmission disk is configured to move toward the output-torque receiving disk by means of an action of an axial-pressure centrifugal weight that moves radially outward when the driving unit rotates.

7. The multi-free-disk type of clutch according to claim 6, wherein
the drive-torque transmission disk is biased by a spring in such a manner that the drive-torque transmission disk moves away from the output-torque receiving disk when the axial-pressure centrifugal weight returns radially inward when the driving unit is decelerated or stopped.

8. The multi-free-disk type of clutch according to claim 7, wherein
a braking unit for the driving-unit is provided for decelerating or stopping the driving unit.

9. The multi-free-disk type of clutch according to claim 8, wherein
a braking-activating unit configured to move the drive-torque transmission disk toward the output-torque receiving disk, when the driving unit is to be decelerated or stopped, is provided.

* * * * *